(12) United States Patent
Hakuta et al.

(10) Patent No.: US 6,743,862 B2
(45) Date of Patent: Jun. 1, 2004

(54) CROSSLINKABLE RUBBER COMPOSITIONS AND USES THEREOF

(75) Inventors: Takashi Hakuta, Chiba (JP); Mitsunao Arino, Chiba (JP); Yoshiharu Kikuchi, Chiba (JP); Masaaki Kawasaki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/049,888

(22) PCT Filed: Jun. 19, 2001

(86) PCT No.: PCT/JP01/05222

§ 371 (c)(1),
(2), (4) Date: Feb. 19, 2002

(87) PCT Pub. No.: WO01/98407

PCT Pub. Date: Dec. 27, 2001

(65) Prior Publication Data

US 2003/0013818 A1 Jan. 16, 2003

(30) Foreign Application Priority Data

Jun. 20, 2000 (JP) ......................................... 2000-189745

(51) Int. Cl.$^7$ .................................................. C08F 8/00
(52) U.S. Cl. ................. 525/105; 525/331.7; 525/332.1; 525/342
(58) Field of Search .............................. 525/105, 331.7, 525/332.1, 342

(56) References Cited

U.S. PATENT DOCUMENTS

| | | |
|---|---|---|
| 5,260,377 A | 9/1993 | Weber et al. |
| 5,672,660 A * | 9/1997 | Medsker et al. ............. 525/101 |
| 6,040,407 A | 3/2000 | Ishida et al. ................. 526/281 |

FOREIGN PATENT DOCUMENTS

| | | | |
|---|---|---|---|
| EP | 0 776 937 A2 | 6/1997 | |
| EP | 0 855 246 A2 | 7/1998 | |
| EP | 1 006 150 A1 | 6/2000 | |
| JP | 04-185687 | 7/1992 | .......... C09J/201/00 |
| JP | 8-337698 A | 12/1996 | |
| JP | 09-40586 | 2/1997 | ........... C07C/13/43 |
| JP | 9-137002 A | 5/1997 | |
| JP | 9-165481 A | 6/1997 | |
| JP | 10-212389 A | 8/1998 | |
| JP | 11-130914 A | 5/1999 | |
| WO | WO 98/38226 | 3/1998 | |
| WO | WO 99/03927 | 1/1999 | |
| WO | WO 00/43447 | 7/2000 | |
| WO | WO 01/07516 | 2/2001 | |

* cited by examiner

*Primary Examiner*—Bernard Lipman
(74) *Attorney, Agent, or Firm*—Burns, Doane, Swecker & Mathis, LLP

(57) ABSTRACT

The crosslinkable rubber composition is crosslinkable at room temperature, has a gelation time at room temperature of 30 days or less, and can prepare a crosslinked rubber sheet by crosslinking the composition at room temperature, wherein the crosslinked rubber sheet has a tensile elongation of 20% or more, and is free of cracks after treatment at 40° C. in a 50 pphm ozone concentration for 96 hr. Specifically, it comprises an ethylene/α-olefin/non-conjugated polyene random copolymer rubber comprising a norbornene compound having a specific vinyl end group, an SiH group-containing compound, which has at least two SiH groups in one molecule, and optionally a platinum catalyst, a reaction inhibitor and/or a silane-coupling agent. The sealing, potting and coating materials and adhesives of the present invention comprise the above rubber composition.

42 Claims, No Drawings

CROSSLINKABLE RUBBER COMPOSITIONS AND USES THEREOF

FIELD OF THE INVENTION

The present invention relates to rubber compositions crosslinkable at room temperature and uses thereof. More particularly, the present invention relates to crosslinkable rubber compositions which enable high crosslinking rate at room temperature, efficient productivity to produce a crosslinked rubber molded product, and low-cost production of a crosslinked rubber molded product excellent in weather, ozone, heat aging and compression set resistances, and the uses thereof. The invention also relates to crosslinkable rubber compositions having excellent moldability and adhesion in addition to the above properties, which are thus suitable as a sealing material and the like, and uses of the compositions.

BACKGROUND OF THE INVENTION

Curing materials have been employed in sealing, coating, potting and bonding of items in industries involving electric and electronic parts or transport aircrafts, and in other industries, such as civil engineering and construction, medical and leisure industries.

An exemplary curing material is one (composition) comprising an organic polymer having a silicon-containing group which contains a hydroxyl group or a hydrolyzable group each bonded to a silicon atom and is crosslinkable by formation of a siloxane bond.

The curing material requires moisture at its curing and the curing takes a long time.

In order to solve the above problems, a composition has been developed wherein polyorganosiloxane having at least two vinyl groups on the average in one molecule is crosslinked with an organohydrogensiloxane having 2 or more hydrogen atoms bonded to a silicon atom in a molecule. The composition can be employed as the curing material for its excellent weather, water and heat resistances. However, the composition has defects such as high costs, poor adhesion, easy outbreak of fungus and unsatisfactory resistance to gas permeability, which limits therefore its applications.

A composition disclosed in Japanese Patent Application Laid-Open No.4(1992)-185687 solves the above problem. This composition comprises a compound having at least one alkenyl group in a molecule, a compound having at least two hydrosilyl groups in a molecule, a hydrosilylation catalyst, and a silane coupling agent. In the examples described in this publication, use was made of terminal-allyl group etherified polyoxypropylene, polypropyleneoxide having a hydrosilyl group, allyl-terminated polycaprolactam, polycaprolactam having cyclic hydrogenpolysiloxane, allyl-terminated polyisoprene, and hydrogenated polyisoprene having cyclic hydrogenpolysiloxane.

According to the present inventors' supplementary examination for the examples of the publication, admittedly shorten curing time and improved adhesion, but the curing rate, the weather resistance and the heat aging resistance remained unsatisfying. The adhesion still required further improvement.

The present inventors therefore made an earnest study on an ethylene/α-olefin/non-conjugated polyene random copolymer rubber composition, and found that a rubber composition comprising an ethylene/α-olefin/non-conjugated polyene random copolymer rubber (A), an SiH group-containing compound (B) containing at least two SiH groups in one molecule, and optionally, a catalyst (C), a reaction inhibitor (D), a silane coupling agent (E) and a plasticizer (F) enables high crosslinking rate at room temperature, efficient productivity to produce a crosslinked rubber molded product, and low-cost production of a crosslinked rubber molded product excellent in weather, ozone, heat aging and compression set resistances. Based on such findings, the present invention has been completed.

OBJECT OF THE INVENTION

The present invention has been made to solve the problems associated to the prior art, and an object of the present invention is to provide crosslinkable rubber compositions which enable high crosslinking rate at room temperature, efficient productivity to produce a crosslinked rubber molded product, and low-cost production of a crosslinked rubber molded product which is excellent in weather, ozone, heat aging and compression set resistances, and is attractive in terms of production costs. It is another object of the present invention to provide crosslinkable rubber compositions having excellent moldability and adhesion in addition to the above properties, which are thus suitable as a sealing material or the like. It is further object of the present invention to provide products which comprise the compositions, and are excellent in curing rate, weather resistance, heat aging resistance and adhesion, particularly with inorganic materials such as a metal, which products are clarified by sealing, potting and coating materials and an adhesive employed in industries involving electric and electronic parts or transportation machines, and in other industries, such as civil engineering and construction, medical and leisure industries.

SUMMARY OF THE INVENTION

The first crosslinkable rubber composition of the present invention is crosslinkable at room temperature (25° C.), has a gelation time at room temperature of 30 days or less, and has properties that a crosslinked rubber sheet obtained by crosslinking the composition at room temperature has a tensile elongation of 20% or more (JIS K-6251: measurement temperature 20° C.; tensile rate 500 mm/min) and has no crack after a treatment at 40° C. in a 50 pphm ozone concentration for 96 hr in accordance with an ozone deterioration test method defined in JIS K-5259.

The gelation time is determined as follows. The change in frequency was measured using a scanning VNC (SVNC) (manufactured by Rapra Technology Ltd.). The frequency increases with proceeding of this measurement, and when it stabilized, it was taken to be 100%. The time that the frequency changed 95% was taken as the gelation time (crosslinking time). The measuring temperature was room temperature and the measuring procedure was carried out according to the following literatures.

(i) RAPRA Operation manual (Software Ver. 2.2) of Scanning vibrating needle type curemeter (scanning VNC)

(ii) RAPRA Curing comprehension (RTL/2844) Scanning vibrating needle type curemeter (scanning VNC).

The second crosslinkable rubber composition according to the present invention comprises:

(A) an ethylene/α-olefin/non-conjugated polyene random copolymer rubber having structural units derived from at least one norbornene compound having a vinyl group at the end, which is non-conjugated polyene, represented by the formula (I) or (II),

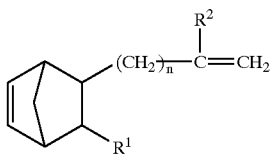 (I)

wherein n is an integer of 0 to 10,
R¹ is hydrogen or an alkyl group of 1 to 10 carbon atoms, and
R² is hydrogen or an alkyl group of 1 to 5 carbon atoms;

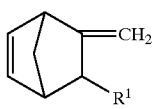 (II)

wherein R³ is hydrogen or an alkyl group of 1 to 10 carbon atoms, and
(B) an SiH group-containing compound having at least two SiH groups in one molecule; and has a gelation time at room temperature (25° C.) of 30 days or less.

The second crosslinkable rubber composition according to the present invention may comprise:
(A) an ethylene/α-olefin/non-conjugated polyene random copolymer rubber,
(B) an SiH group-containing compound having at least two SiH groups in one molecule, and
(C) a catalyst,
or it may comprise:
(A) an ethylene/α-olefin/non-conjugated polyene random copolymer rubber,
(B) an SiH group-containing compound having at least two SiH groups in one molecule,
(C) a catalyst, and
(D) a reaction inhibitor and/or
(E) a silane coupling agent.

The second crosslinkable rubber composition may further comprise a plasticizer (F) in an amount of 1 to 1,000 parts by weight based on 100 parts by weight of the ethylene/α-olefin/non-conjugated polyene random copolymer rubber (A). The above amount of plasticizer (F) is preferable when the ethylene/α-olefin/non-conjugated polyene random copolymer rubber (A) has the following properties (i) to (v).

The ethylene/α-olefin/non-conjugated polyene random copolymer rubber (A) has:
(i) a molar ratio of ethylene to an α-olefin of 3 to 20 carbon atoms (ethylene/α-olefin) of 40/60 to 95/5,
(ii) an iodine value of 0.5 to 50, and
(iii) an intrinsic viscosity (η) as measured in decalin at 135° C. of 0.01 to 2 dl/g.

In addition to the properties (i), (ii) and (iii) the copolymer rubber (A) preferably has:
(iv) a molecular weight distribution (Mw/Mn) determined by GPC of 3 to 100, and
(v) an effective network chain density (ν), as measured after the ethylene/α-olefin/non-conjugated polyene random copolymer rubber (A) is press crosslinked at 170° C. for 10 min using 0.01 mol of dicumylperoxide based on 100 g of the copolymer rubber (A), of $0.5 \times 10^{20}$ chains/cm or more.

In addition to the properties (i), (ii), (iii), (iv) and (v), the ethylene/α-olefin/non-conjugated polyene random copolymer rubber (A) more preferably has:
(vi) a relation between a ratio of a shear rate $\gamma_2$ corresponding to a shear stress of $2.4 \times 10^6$ dyn/cm² to a shear rate $\gamma_1$ corresponding to a shear stress of $0.4 \times 10^6$ dyn/cm² ($\gamma_2/\gamma_1$), both obtained by a melt flow curve at 100° C., and the effective network chain density (ν) satisfies the formula (III):

$$0.04 \times 10^{-19} \leq \text{Log}(\gamma_2/\gamma_1)/\nu \leq 0.20 \times 10^{-19}$$ (III).

The ethylene/α-olefin/non-conjugated polyene random copolymer rubber (A) having the properties (i) to (vi) can be produced, for example, by copolymerization of ethylene, an α-olefin and a norbornene compound of the formula (I) or (II) using a catalyst containing the following compounds (H) and (I) as main components under the conditions of a polymerization temperature of 30 to 60° C., a polymerization pressure of 4 to 12 kgf/cm², and a feed rate molar ratio (non-conjugated polyene/ethylene) of the non-conjugated polyene to ethylene of 0.01 to 0.2.

(H) A soluble vanadium compound represented by the formula: $VO(OR)_n X_{3-n}$, wherein R is a hydrocarbon group, X is a halogen atom, and n is 0 or an integer of 1 to 3, or a vanadium compound represented by the formula: $VX_4$ wherein X is a halogen atom.

(I) An organoaluminum compound represented by the formula: $R'_m AlX'_{3-m}$ wherein R' is a hydrocarbon group, X' is a halogen atom, and m is 1 to 3.

The ethylene/α-olefin/non-conjugated polyene random copolymer rubber (A) preferably has an insoluble content of 1% or less after subjecting to Soxhlet extraction (solvent: boiling xylene, extraction time: 3 hr, mesh: 325).

As the catalyst (C), a platinum catalyst is preferably employed.

Preferably, the second crosslinkable rubber composition of the present invention is crosslinkable at room temperature, has a gelation time at room temperature of 30 days or less, and has properties that a crosslinked rubber sheet obtained by crosslinking the composition at room temperature has a tensile elongation of 20% or more (JIS K-6251: measurement temperature 20° C.; tensile rate 500 mm/min) and has no crack after a treatment at 40° C. in a 50 pphm ozone concentration for 96 hr, and particularly, a crosslinking rate ($t_c(90)$) at 160° C. of 15 min or less.

The first and the second crosslinkable rubber compositions preferably have an adhesion strength to aluminum (JIS A5758(1986)) of 0.1 to 20 MPa, preferably 0.2 to 15 MPa, more preferably 0.5 to 10 MPa, particularly preferably 1 to 5 MPa.

The third crosslinkable rubber composition of the present invention comprises the ethylene/α-olefin/non-conjugated polyene random copolymer rubber (A) and the SiH group-containing compound (B), and has an adhesion strength (JIS A5758 (1986)) to aluminum of 0.1 to 20 MPa.

The fourth crosslinkable rubber composition of the present invention comprises the ethylene/α-olefin/non-conjugated polyene random copolymer rubber (A) and the SiH group-containing compound (B), wherein the copolymer rubber (A) has an intrinsic viscosity (η) as measured in decalin at 135° C. of 0.01 to 0.95 dl/g.

The third crosslinkable rubber composition of the present invention may be the fourth crosslinkable rubber composition.

The third and the fourth crosslinkable rubber compositions may optionally contain a catalyst (C), a reaction inhibitor (D), a silane coupling agent (E), and a plasticizer (F) within the limit not detrimental to the object of the present invention.

The first to the fourth crosslinkable rubber compositions of the invention are preferably used for electric and electronic parts, transportation machines, civil engineering and construction materials, medical appliances and leisure activity goods.

Uses for the electric and electronic parts include sealing materials, potting materials and coating material and adhesives respectively applied to heavy electric apparatus parts, light electrical appliance parts, or circuits and substrates of electric and electronic machinery and tools; repairing materials for covered electric wire; insulating sealing materials for electric wire joint parts; rolls for office automation equipments; vibration absorbing materials; and gels or encapsulation materials for condensers.

The sealing materials are suitably used for refrigerators, freezers, washing machines, gas meters, microwave ovens, steam irons and circuit breakers.

The potting materials are suitably used for potting transformer high-tension circuits, printed boards, high voltage transformers equipped with a variable resistor, electrical insulating parts, semi-conductive parts, conductive parts, solar cells, and TV fly-back transformers.

The coating materials are suitably used for coating circuit elements such as a high voltage thick film resistor and a hybrid IC; HIC; electrical insulating parts; semi-conductive parts; conductive parts; modules; printed circuits; ceramic boards; buffer materials for diodes, transistors and bonding wires; semi-conductive elements; and optical fibers for optical communication.

The adhesives are suitably used for bonding cathode-ray tube wedges or necks, electrical insulating parts, semi-conductive parts and conductive parts.

The transportation machines are automobiles, ships, airplanes and railway vehicles.

Uses for the automobiles include sealing materials for gaskets of automobile engines, electric trim parts and oil filters; potting materials for ignitor HIC and automobile hybrid IC; coating materials for automobile bodies, automobile window glass and engine control substrates; and adhesives for gaskets of oil pans, gaskets of timing belt covers, other automotive gaskets, automotive moles, head lamp lenses, sun roof seals and mirrors.

Uses for the ships include sealing materials for wiring and connecting distributor boxes, electric system parts and electric wires; and adhesives for electric wires and glass.

Uses for the civil engineering and construction include sealants of building material for butt joints in glass screen method of commercial buildings, joints of glass fringes fixed with sash, interior finishing joins of toilet facilities, lavatory and show cases, joints of bath tub circumferences, outer wall expansion joints of prefabrication houses, and joints of siding boards; sealing materials for double glazing units; civil engineering sealants used in road maintenance; coatings and adhesives for metals, glass, stone materials, slates, concretes and tiles; and adhesive sheets, water proofing sheets and vibration-proof sheets.

Uses for the medical appliances include sealing materials for medicinal rubber stoppers, syringe gaskets and rubber stoppers for reducing blood pressure.

Uses for the goods for leisure activities include swimming materials, such as swimming caps, diving masks and earplugs; and gel buffer materials for sport shoes and baseball gloves.

The sealing, potting and coating materials and the adhesives according to the present invention comprise any one of the first to the fourth crosslinkable rubber compositions of the invention.

BEST MODE TO CARRY OUT THE INVENTION

The crosslinkable rubber compositions and uses thereof of the present invention are described below in more detail.

The first crosslinkable rubber composition of the present invention is crosslinkable at room temperature (25° C.), has a gelation time at room temperature of 30 days or less, and has properties that a crosslinked rubber sheet obtained by crosslinking the composition at room temperature has a tensile elongation of 20% or more (JIS K-6251: measurement temperature 20° C.; tensile rate 500 mm/min) and has no crack after a treatment at 40° C. in a 50 pphm ozone concentration for 96 hr in accordance with an ozone deterioration test method defined in JIS K-5259.

The second crosslinkable rubber composition of the invention comprises an ethylene/α-olefin/non-conjugated polyene random copolymer rubber (A), an SiH group-containing compound (B) containing at least two SiH groups in one molecule, and optionally a catalyst (C), a reaction inhibitor (D) a silane coupling agent (E), and a plasticizer (F), and has a gelation time at room temperature of 30 days or less.

The second crosslinkable rubber composition of the present invention is preferably crosslinkable at room temperature (25° C.), has a gelation time at room temperature of 30 days or less, and has properties that a crosslinked rubber sheet obtained by crosslinking the composition at room temperature has a tensile elongation of 20% or more (JIS K-6251: measurement temperature 20° C.; tensile rate 500 mm/min) and has no crack after a treatment at 40° C. in a 50 pphm ozone concentration for 96 hr, which rubber has the same properties as the first rubber composition of the present invention.

These rubber compositions have a gelation time at room temperature of 30 days or less, preferably 20 days or less, more preferably 10 days or less, even more preferably 7 days or less, still preferably 5 days or less, highly preferably 3 days or less, particularly preferably 2 days or less, most preferably 1 day or less.

Ethylene/α-olefin/Non-Conjugated Polyene Random Copolymer Rubber (A)

The ethylene/α-olefin/non-conjugated polyene random copolymer rubber (A) for use in the invention is a random copolymer of ethylene, an α-olefin of 3 to 20 carbon atoms and non-conjugated polyene.

Examples of the α-olefin of 3 to 20 carbon atoms include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. Among these, preferable are α-olefins of 3 to 10 carbon atoms, and particularly preferable are propylene, 1-butene, 1-hexene and 1-octene.

These α-olefins are used singly or in combination of two or more kinds.

The non-conjugated polyene for use in the invention is a norbornene compound having a vinyl group at the end represented by the following formula (I) or (II):

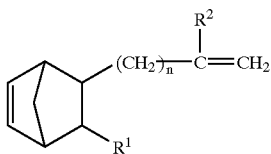

(I)

In the formula (I), n is an integer of 0 to 10, $R^1$ is hydrogen or an alkyl group of 1 to 10 carbon atoms, specifically, methyl, ethyl, propyl, isopropyl, n-butyl, isobutyl, sec-butyl, t-butyl, n-pentyl, isopentyl, t-pentyl, neopentyl, hexyl, isohexyl, heptyl, octyl, nonyl and decyl groups; and $R^2$ is hydrogen or an alkyl group of 1 to 5 carbon atoms.

Examples of alkyl groups of 1 to 5 carbon atoms for $R^2$ include those of 1 to 5 carbon atoms exemplified with respect to $R^1$.

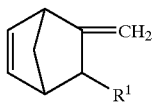

(II)

In the formula (II), $R^3$ is hydrogen or an alkyl group of 1 to 10 carbon atoms.

Examples of alkyl groups for $R^3$ include the same ones as exemplified with respect to $R^1$.

Examples of the norbornene compound represented by the formula (I) or (II) include:

5-methylene-2-norbornene, 5-vinyl-2-norbornene,
5-(2-propenyl)-2-norbornene,
5-(3-butenyl)-2-norbornene,
5-(1-methyl-2-propenyl)-2-norbornene,
5-(4-pentenyl)-2-norbornene,
5-(1-methyl-3-butenyl)-2-norbornene,
5-(5-hexenyl)-2-norbornene,
5-(1-methyl-4-pentenyl)-2-norbornene,
5-(2,3-dimethyl-3-butenyl)-2-norbornene,
5-(2-ethyl-3-butenyl)-2-norbornene,
5-(6-heptenyl)-2-norbornene,
5-(3-methyl-5-hexenyl)-2-norbornene,
5-(3,4-dimethyl-4-pentenyl)-2-norbornene,
5-(3-ethyl-4-pentenyl)-2-norbornene,
5-(7-octenyl)-2-norbornene,
5-(2-methyl-6-heptenyl)-2-norbornene,
5-(1,2-dimethyl-5-hexenyl)-2-norbornene,
5-(5-ethyl-5-hexenyl)-2-norbornene and
5-(1,2,3-trimethyl-4-pentenyl)-2-norbornene. Among these, preferable are 5-vinyl-2-norbornene,
5-methylene-2-norbornene,
5-(2-propenyl)-2-norbornene,
5-(3-butenyl)-2-norbornene,
5-(4-pentenyl)-2-norbornene,
5-(5-hexenyl)-2-norbornene,
5-(6-heptenyl)-2-norbornene and
5-(7-octenyl)-2-norbornene. These norbornene compounds can be used singly or in combination.

With the norbornene compound such as 5-vinyl-2-norbornene, non-conjugated polyene can be used in combination within limits not detrimental to the aimed properties of the invention.

Examples of the non-conjugated polyene are:
chain non-conjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, and 7-methyl-1,6-octadiene;

cyclic non-conjugated dienes, such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene; and trienes, such as 2,3-diisopropylidene-5-norbornene, 2-ethylidene-3-isopropylidene-5-norbornene, and 2-propenyl-2,2-norbornadiene.

The ethylene/α-olefin/non-conjugated polyene random copolymer rubber (A) comprising the above components has the following properties.

(i) Molar Ratio of Ethylene to an α-Olefin of 3 to 20 Carbon Atoms (Ethylene/α-Olefin)

The ethylene/α-olefin/non-conjugated polyene random copolymer rubber (A) contains constituent units (a) derived from ethylene and constituent units (b) derived from an α-olefin of 3 to 20 carbon atoms (sometimes referred to simply as "α-olefin" hereinafter) in a molar ratio ((a)/(b)) of 40/60 to 95/5, preferably 50/50 to 90/10, more preferably 55/45 to 85/15, particularly preferably 60/40 to 80/20.

When the molar ratio is in the above range, there can be obtained a rubber composition capable of providing a crosslinked rubber molded product excellent in low-temperature resistance and processability as well as in heat aging resistance, strength properties and rubber elasticity.

(ii) Iodine Value

The ethylene/α-olefin/non-conjugated polyene random copolymer rubber (A) has an iodine value of 0.5 to 50 (g/100 g), preferably 0.8 to 40 (g/100 g), more preferably 1 to 30 (g/100 g), highly preferably 1.5 to 25 (g/100 g).

When the iodine value is in the above range, there can be obtained a rubber composition having a high crosslinking rate at room temperature, and a crosslinked rubber molded product excellent in compression set resistance and in environmental deterioration resistance (i.e., heat aging resistance). An iodine value exceeding 50 is not favorable because of disadvantageous costs.

(iii) Intrinsic Viscosity

The intrinsic viscosity (η) of the ethylene/α-olefin/non-conjugated polyene random copolymer rubber (A), as measured in decalin at 135° C., is in the range of 0.01 to 2 dl/g, preferably 0.02 to 1.8 dl/g, more preferably 0.05 to 1.5 dl/g, highly preferably 0.1 to 1.4 dl/g. When the intrinsic viscosity (η) is in the above range, there can be obtained a rubber composition which has excellent flowability, and is capable of providing a crosslinked rubber molded product having excellent strength properties and compression set resistance.

The intrinsic viscosity (η) is desired to be in the range of 0.01 to 0.95 dl/g, preferably 0.05 to 0.90 dl/g, more preferably 0.1 to 0.8 dl/g, highly preferably 0.3 to 0.7 dl/g, from the viewpoints of the moldability, adhesion, and post-bonding strength.

Further, the intrinsic viscosity (η) is desired to be in the range of 0.01 to 0.5 dl/g, preferably 0.01 to below 0.3 dl/g, more preferably 0.1 to 0.25 dl/g, from the viewpoints of the moldability, adhesion, and the spreading on an interface at the time of bonding.

(iv) Molecular Weight Distribution (Mw/Mn)

The molecular weight distribution (Mw/Mn) of the ethylene/α-olefin/non-conjugated polyene random copolymer rubber (A), as measured by GPC, is in the range of 3 to 100, preferably 3.3 to 75, more preferably 3.5 to 50.

When the molecular weight distribution (Mw/Mn) is in the above range, there can be obtained a rubber composition having excellent processability and being capable of providing a crosslinked rubber molded product excellent in strength properties.

(v) Effective Network Chain Density (v) (Indication of Crosslinking Density)

The effective network chain density (v), as measured after the ethylene/α-olefin/non-conjugated polyene random copolymer rubber (A) is press crosslinked at 170° C. for 10 min using 0.01 mol of dicumylperoxide based on 100 g of the copolymer rubber (A), is $0.5 \times 10^{20}$ chains/cm$^3$ or more, preferably $0.8 \times 10^{20}$ chains/cm$^3$ or more, more preferably $1.0 \times 10^{20}$ chains/cm$^3$.

When the effective network chain density (v) is $0.5 \times 10^{20}$ chains/cm$^3$ or more, there can be obtained a rubber composition capable of providing a crosslinked rubber molded product excellent in compression set resistance.

The ethylene/α-olefin/non-conjugated polyene random copolymer rubber (A) can be obtained by random copolymerizing ethylene, an α-olefin of 3 to 20 carbon atoms and a terminal vinyl group-containing norbornene compound of the formula (I) or (II) in the presence of a catalyst containing compounds (H) and (I) described below as main components under the conditions of a polymerization temperature of 30 to 60° C., specifically 30 to 59° C., a polymerization pressure of 4 to 12 kgf/cm$^2$, specifically 5 to 8 kgf/cm$^2$, and a feed rate molar ratio (non-conjugated polyene/ethylene) of the non-conjugated polyene to ethylene of from 0.01 to 0.2. The copolymerization is preferably conducted in a hydrocarbon medium.

(H) A soluble vanadium compound represented by the formula: $VO(OR)_nX_{3-n}$ wherein R is a hydrocarbon group, X is a halogen atom, and n is 0 or an integer of 1 to 3, or a vanadium compound represented by the formula: $VX_4$ wherein X is a halogen atom.

The soluble vanadium compound (H) is soluble in a hydrocarbon medium of the polymerization reaction system. Specific examples are vanadium compounds represented by the formula: VO(OR)aXb, or V(OR)cXd wherein R is a hydrocarbon group, $0 \leq a \leq 3$, $0 \leq b \leq 3$, $2 \leq a+b \leq 3$, $0 \leq c \leq 4$, $0 \leq d \leq 4$, and $3 \leq c+d \leq 4$; and electron donor adducts of these.

More specifically, there can be mentioned $VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_3$, $VCl_4$, $VOCl_3$, $VO(O\text{-n-}C_4H_9)_3$, and $VCl_3 \cdot 2OC_6H_{12}OH$.

(I) An organoaluminum compound represented by the formula: $R'_mAlX'_{3-m}$ wherein R' is a hydrocarbon group, X' is a halogen atom, and m is 1 to 3.

Examples of the organoaluminum compound (I) include:

trialkylaluminums, such as triethylaluminum, tributylaluminum, and triisopropylaluminum;

dialkylaluminum alkoxides, such as diethylaluminum ethoxide, and dibutylaluminum botoxide;

alkylaluminum sesquialkoxides, such as ethylaluminum sesquiethoxide, and butylaluminum sesquibutoxide;

partially alkoxylated alkylaluminums having average composition, represented by $R^1_{0.5}Al(OR')_{0.5}$;

dialkylaluminum halides, such as diethylaluminum chloride, dibutylaluminum chloride, and diethylaluminum bromide;

partially halogenated alkylaluminums, such as alkylaluminum sesquihalides (e.g., ethylaluminum sesquichloride, butylaluminum sesquichloride, ethylaluminum sesquibromide), and alkylaluminum dihalides (e.g., ethylaluminum dichloride, propylaluminum dichloride, butylaluminum dibromide);

partially hydrogenated alkylaluminums, such as dialkylaluminum hydrides (e.g., diethylaluminum hydride, dibutylaluminum hydride), and alkylaluminum dihydrides (e.g., ethylaluminum dihydride, propylaluminum dihydride); and partially alkoxylated and halogenated alkylaluminums, such as ethylaluminum ethoxychloride, butylaluminum butoxychloride, and ethylaluminum ethoxybromide.

In the present invention, a soluble vanadium compound represented by $VOCl_3$ selected from the compounds (H) and a blend of $Al(OC_2H_5)_2Cl$ and $Al_2(OC_2H_5)_3Cl_3$ (blending ratio: not less than $1/5 = Al(OC_2H_5)_2Cl/Al_2(OC_2H_5)_3Cl_3$) selected from the compounds (I) are preferably used as the catalyst components, whereby an ethylene/α-olefin/non-conjugated polyene random copolymer rubber (A) having an insoluble content of 1% or less after Soxhlet extraction (solvent: boiling xylene, extraction time: 3 hr, mesh: 325) can be obtained.

As the catalyst for the copolymerization, a "metallocene catalyst", as disclosed in, for example, Japanese Patent Laid-Open Application No. 9(1997)-40586, may be used.

The ethylene/α-olefin/non-conjugated polyene random copolymer rubber (A) for use in the invention may be graft-modified with a polar monomer such as unsaturated carboxylic acid, or a derivative thereof (e.g., acid anhydride, ester).

Examples of the unsaturated carboxylic acids include acrylic acid, methacrylic acid, maleic acid, fumaric acid, itaconic acid, citraconic acid, tetrahydrophthalic acid and bicyclo(2,2,1)hept-2-ene-5,6-dicarboxylic acid.

Examples of the acid anhydrides of unsaturated carboxylic acid include maleic anhydride, itaconic anhydride, citraconic anhydride, tetrahydrophthalic anhydride, and bicyclo (2,2,1)hept-2-ene-5,6-dicarboxylic anhydride. Among these, maleic anhydride is preferable.

Examples of the unsaturated carboxylic esters include methyl acrylate, methyl methacrylate, dimethyl maleate, monomethyl maleate, dimethyl fumarate, dimethyl itaconate, diethyl citraconate, dimethyl tetrahydrophthalate, and dimethyl bicyclo(2,2,1)hept-2-ene-5,6-dicarboxylate. Among these, methyl acrylate and ethyl acrylate are preferable.

The graft modifiers (graft monomers), such as the above unsaturated carboxylic acids, are used singly or in combination of two or more kinds. In any case, they are used in an amount of 0.1 mol or less based on 100 g of the ethylene/α-olefin/non-conjugated polyene copolymer rubber before the graft modification.

When the ethylene/α-olefin/non-conjugated polyene random copolymer rubber (A) having the above graft amount is used, a rubber composition having excellent flowability (molding processability) and capable of providing a crosslinked rubber molded product having excellent low-temperature resistance can be obtained.

The graft-modified ethylene/α-olefin/non-conjugated polyene random copolymer rubber (A) can be obtained by allowing the unmodified ethylene/α-olefin/non-conjugated polyene random copolymer rubber to react with the unsaturated carboxylic acid or its derivative in the presence of a radical initiator.

The graft reaction may be carried out in a solution state or a molten state. In case of the graft reaction in a molten state, it is most effective and preferable to conduct continuously in an extruder.

Examples of the radical initiator used in the graft reaction include:

dialkyl peroxides, such as dicumyl peroxide, di-t-butyl peroxide, di-t-butylperoxy-3,3,5- trimethylcyclohexane, t-butylcumyl peroxide, di-t-amyl peroxide, t-butylhydro peroxide, 2,5-dimethyl-2,5-di(t-butylperoxy)hexyne-3,2,5-dimethyl-2,5-di(benzoylperoxy)hexane, 2,5-dimethyl-2,5-di(t-butylperoxy)hexane, and α,α'-bis(t-butylperoxy-m-isopropyl)benzene;

peroxy esters, such as t-butyl peroxyacetate, t-butyl peroxyisobutyrate, t-butyl peroxypivalate, t-butyl peroxymaleate, t-butyl peroxyneodecanoate, t-butyl peroxybenzoate, and di-t-butyl peroxynaphthalate;

ketone peroxides, such as dicyclohexanone peroxide; and mixtures thereof. Among these, preferable are organic peroxides having a temperature at which the half-life period corresponds to one minute, of 130 to 200° C. Highly preferable are dicumyl peroxide, di-t-butyl peroxide, di-t-butylperoxy-3,3,5-trimethylcyclohexane, t-butylcumyl peroxide, di-t-amylperoxide, and t-butylhydro peroxide.

Examples of the polar monomers other than the unsaturated carboxylic acids and derivatives thereof (e.g., acid anhydrides, esters) include hydroxyl group-containing ethylenically unsaturated compounds, amino group-containing ethylenically unsaturated compounds, epoxy group-containing ethylenically unsaturated compounds, aromatic vinyl compounds, vinyl ester compounds and vinyl chloride.

SiH Group-Containing Compound (B)

The SiH group-containing compound (B) used in the present invention reacts with the ethylene/α-olefin/non-conjugated polyene random copolymer rubber (A), and works as a crosslinking agent. There is no specific limitation on the molecular structure of the SiH group-containing compound (B), and conventionally-produced resins, such as those of linear, cyclic, branched and three-dimensional network structures, are also employable. However, they are conditioned to contain at least two (preferably 3 or more) hydrogen atoms bonded directly to silicon atoms, namely, SiH groups, in one molecule.

As the SiH group-containing compound (B), usually employable is a compound represented by the following composition formula:

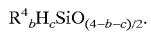

$$R^4{}_bH_cSiO_{(4-b-c)/2}.$$

In the above formula, $R^4$ is a substituted or unsubstituted monovalent hydrocarbon group of 1 to 10, particularly 1 to 8 carbon atoms, excluding an aliphatic unsaturated bond. Examples of the monovalent hydrocarbon group include a phenyl group, halogen-substituted alkyl groups, such as a trifluoropropyl group, and the alkyl groups previously exemplified with respect to $R^1$. Of these, preferable are methyl, ethyl, propyl, phenyl, and trifluoropropyl groups, and highly preferable are methyl and phenyl groups.

The letter b is a number satisfying the condition of $0 \leq b < 3$, preferably $0.6 < b < 2.2$, highly preferably $1.5 \leq b \leq 2$. The letter c is a number satisfying the condition of $0 < c \leq 3$, preferably $0.002 \leq c < 2$, highly preferably $0.01 \leq c \leq 1$. The sum of b and c is a number satisfying the condition of $0 < b+c \leq 3$, preferably $1.5 < b+c \leq 2.7$.

The SiH group-containing compound (B) is an organohydrogen polysiloxane having preferably 2 to 1000 silicon atoms, particularly preferably 2 to 300 silicon atoms, most preferably 4 to 200 silicon atoms, in one molecule. Specific examples of such compounds include:

siloxane oligomers, such as 1,1,3,3-tetramethyldisiloxane, 1,3,5,7-tetramethyltetracyclosiloxane, and 1,3,5,7,8-pentamethylpentacyclosiloxane;

methylhydrogenpolysiloxane terminated with trimethylsiloxy groups at the both ends of molecular chain; a dimethylsiloxane/methylhydrogensiloxane copolymer terminated with trimethylsiloxy groups at the both ends of molecular chain; methylhydrogenpolysiloxane terminated with silanol groups at the both ends of molecular chain; a dimethylsiloxane/methylhydrogensiloxane copolymer terminated with silanol groups at the both ends of molecular chain; dimethylpolysiloxane terminated with dimethylhydrogensiloxy groups at the both ends of molecular chain; methylhydrogenpolysiloxane terminated with dimethylhydrogensiloxy groups at the both ends of molecular chain; a dimethylsiloxane/methylhydrogensiloxane copolymer terminated with dimethylhydrogensiloxy groups at the both ends of molecular chain; and silicon resins comprising $R^4{}_2(H)SiO_{1/2}$ units and $SiO_{4/2}$ units, and arbitrarily containing $R^4{}_3SiO_{1/2}$ units, $R^4{}_2SiO_{2/2}$ units, $R^4(H)SiO_{2/2}$ units, $(H)SiO_{3/2}$ units, or $R^4SiO_{3/2}$ units.

As the methylhydrogenpolysiloxane terminated with trimethylsiloxy groups at the both ends of molecular chain, there can be mentioned compounds represented by the following formula, and compounds of the same formula in which methyl groups are partially or totally substituted with ethyl, propyl, phenyl, or trifluoropropyl groups:

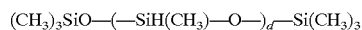

(CH₃)₃SiO—(—SiH(CH₃)—O—)_d—Si(CH₃)₃ wherein d is an integer of 2 or more.

As the dimethylsiloxane/methylhydrogensiloxane copolymer terminated with trimethylsiloxy groups at the both ends of molecular chain, there can be mentioned compounds represented by the following formula, specifically compounds of the same formula in which methyl groups are partially or totally substituted with ethyl, propyl, phenyl, or trifluoropropyl groups:

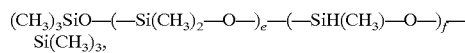

(CH₃)₃SiO—(—Si(CH₃)₂—O—)_e—(—SiH(CH₃)—O—)_f—Si(CH₃)₃, wherein e is an integer of 1 or more, and f is an integer of 2 or more.

As the methylhydrogenpolysiloxane terminated with silanol groups at the both ends of molecular chain, there can be mentioned compounds represented by the following formula, and compounds of the same formula in which methyl groups are partially or totally substituted with ethyl, propyl, phenyl, or trifluoropropyl groups:

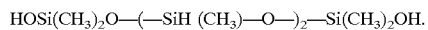

HOSi(CH₃)₂O—(—SiH (CH₃)—O—)₂—Si(CH₃)₂OH.

As the dimethylsiloxane/methylhydrogensiloxane copolymer terminated with silanol groups at the both ends of molecular chain, there can be mentioned compounds represented by the following formula, and compounds of the same formula in which methyl groups are partially or totally substituted with ethyl, propyl, phenyl, or trifluoropropyl groups:

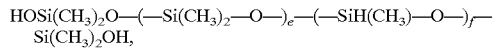

HOSi(CH₃)₂O—(—Si(CH₃)₂—O—)_e—(—SiH(CH₃)—O—)_f—Si(CH₃)₂OH, wherein e is an integer of 1 or more, and f is an integer of 2 or more.

As the dimethylpolysiloxane terminated with dimethylhydrogensiloxy groups at the both ends of molecular chain, there can be mentioned compounds represented by the following formula, and compounds of the same formula in which methyl groups are partially or totally substituted with ethyl, propyl, phenyl, or trifluoropropyl groups:

HSi(CH$_3$)$_2$—(Si(CH$_3$)$_2$—O—)$_e$—Si(CH$_3$)$_2$H, wherein e is an integer of 1 or more.

As the methylhydrogenpolysiloxane terminated with dimethylhydrogensiloxy groups at the both ends of molecular chain, there can be mentioned compounds represented by the following formula, and compounds of the same formula in which methyl groups are partially or totally substituted with ethyl, propyl, phenyl, or trifluoropropyl groups:

HSi(CH$_3$)$_2$O—(—SiH (CH$_3$)—O—)$_e$—Si(CH$_3$)$_2$H, wherein e is an integer of 1 or more.

As the dimethylsiloxane/methylhydrogensiloxane copolymer terminated with dimethylhydrogensiloxy groups at the both ends of molecular chain, there can be mentioned compounds represented by the following formula, and compounds of the same formula in which methyl groups are partially or totally substituted with ethyl, propyl, phenyl, or trifluoropropyl groups:

HSi(CH$_3$)$_2$O—(—Si(CH$_3$)$_2$—O—)$_e$—(—SiH(CH$_3$)—O—)$_h$—Si(CH$_3$)$_2$H, wherein e and h are each an integer of 1 or more.

The above compounds can be prepared by conventional processes. For example, octamethylcyclotetrasiloxane and/or tetramethylcyclotetrasiloxane, and a compound containing a triorganosilyl group or a diorganohydrogensiloxy group, to be a terminal group, such as hexamethyldisiloxane or 1,3-dihydro-1,1,3,3-tetramethyldisiloxane, are equilibrated at a temperature of about −10° C. to about +40° C. in the presence of a catalyst, such as sulfuric acid, trifluoromethanesulfonic acid or methanesulfonic acid.

The SiH group-containing compound (B) is used in an amount of 0.1 to 100 parts by weight, preferably 0.1 to 75 parts by weight, more preferably 0.1 to 50 parts by weight, even more preferably 0.2 to 30 parts by weight, highly preferably 0.2 to 20 parts by weight, particularly preferably 0.5 to 10 parts by weight, most preferably 0.5 to 5 parts by weight, based on 100 parts by weight of the ethylene/α-olefin/non-conjugated polyene random copolymer rubber (A). When the SiH group-containing compound (B) is used in the above amount, there can be obtained a rubber composition capable of forming a crosslinked rubber molded product having a moderate crosslink density, excellent strength properties and elongation properties as well as satisfactory compression set resistance. The use of the SiH group-containing compound (B) in an amount exceeding 100 parts by weight is unfavorable because of disadvantageous cost.

The ratio of the SiH group to aliphatic unsaturated groups participating in the crosslinking of the ethylene/α-olefin/non-conjugated polyene random copolymer rubber (A) (SiH group/aliphatic unsaturated group), is in the range of 0.2 to 20, preferably 0.5 to 10, particularly preferably 0.7 to 5.

Catalyst (C)

The catalyst (C) for optional use in the present invention, is an addition reaction catalyst. There is no specific limitation on the catalyst as far as it accelerates the addition reaction (hydrosilylation of alkene) of the alkenyl group of the ethylene/α-olefin/non-conjugated polyene random copolymer rubber (A) with the SiH group of the SiH group-containing compound (B). For example, addition reaction catalysts comprising platinum group elements (i.e., Group 8 metal type catalysts of Group 8 metals of the Periodic Table, Group 8 metal complexes or Group 8 metal compounds), such as a platinum catalyst, a palladium catalyst and a rhodium catalyst, are employable. Of these, the platinum catalyst is preferable.

As the platinum catalyst, a known platinum catalyst for use in addition curing is generally used. For example, a finely divided metallic platinum catalyst described in U.S. Pat. No. 2,970,150, a chloroplatinic acid catalyst described in U.S. Pat. No. 2,823,218, a complex compound of platinum and hydrocarbon described in U.S. Pat. Nos. 3,159,601 and 159,662, a complex compound of chloroplatinic acid and an olefin described in U.S. Pat. No. 3,516,946, and a complex compound of platinum and vinylsiloxane described in U.S. Pat. Nos. 3,775,452 and 3,814,780 are employable. More specifically, there can be mentioned platinum (platinum black), chloroplatinic acid, a platinum/olefin complex, a platinum/alcohol complex, and platinum supported on a carrier such as alumina or silica.

Examples of the palladium catalysts include palladium, a palladium compound and chloropalladate. Examples of the rhodium catalysts include rhodium, a rhodium compound and chlororhodate.

Other exemplary catalysts (C) are Lewis acids and cobalt carbonyl.

The catalyst (C) is used, in terms of Pt metal, in an amount of 0.1 to 100,000 ppm by weight, preferably 0.1 to 10,000 ppm by weight, more preferably 1 to 5,000 ppm by weight, particularly preferably 5 to 1,000 ppm by weight, based on the ethylene/α-olefin/non-conjugated polyene random copolymer rubber (A).

When the catalyst (C) is used in the above amount, there can be obtained a rubber composition capable of forming a crosslinked rubber molded product having moderate crosslink density, excellent strength properties and elongation properties. The use of catalyst (C) in an amount exceeding 100,000 ppm by weight is unfavorable because of disadvantageous cost.

In this invention, it is also possible to obtain a crosslinked rubber molded product by irradiating an uncrosslinked rubber molded product of a rubber composition containing no catalyst (C), with light, y rays or electron rays.

Reaction Inhibitor (D)

In the present invention, the reaction inhibitor (D) is optionally used together with the catalyst (C) Examples of the reaction inhibitor (D) include benzotriazol, ethynyl group-containing alcohols (e.g., ethynylcyclohexanol), acrylonitrile, amide compounds (e.g., N,N-diallylacetamide, N,N-diallylbenzamide, N,N,N',N'-tetraallyl-o-phthalic acid diamide, N,N,N',N'-tetraallyl-m-phthalic acid diamide, N,N, N',N'-tetraallyl-p-phthalic acid diamide), sulfur, phosphorus, nitrogen, amine compounds, sulfur compounds, phosphorus compounds, tin, tin compounds, tetramethyltetravinylcyclotetrasiloxane, and organic peroxides, such as hydroperoxide.

The reaction inhibitor (D) is used in an amount of 0 to 50 parts by weight, generally 0.0001 to 50 parts is by weight, preferably 0.001 to 30 parts by weight, more preferably 0.005 to 20 parts by weight, even more preferably 0.01 to 10 parts by weight, highly preferably 0.05 to 5 parts by weight, based on 100 parts by weight of the ethylene/α-olefin/non-conjugated polyene random copolymer rubber (A).

The use of the reaction inhibitor (D) in an amount of 50 parts by weight or less inhibits the early crosslinking reaction to assure time necessary for molding, whereby a rubber composition excellent in productivity to produce a crosslinked rubber molded product, can be obtained. The use of the reaction inhibitor (D) in an amount exceeding 50 parts by weight is unfavorable because of disadvantageous cost.

Silane Coupling Agent (E)

In the present invention, the silane coupling agent (E) is optionally used together with the catalyst (C), in order to bond polymers with an interface of a filler and improve the self-adhesion of the rubber composition. As the silane coupling agent (E), there can be mentioned a (meth)acryl functional silane coupling agent, an epoxy functional silane coupling agent, a vinyl functional silane coupling agent, and an amino (imino) functional silane coupling agent.

Specific examples of the (meth)acryl functional silane coupling agent include:

3-methacryloxypropyl trimethoxysilane,
3-methacryloxypropyl triethoxysilane,
3-acryloxypropyl trimethoxysilane,
3-acryloxypropyl triethoxysilane,
methacryloxymethyl trimethoxysilane,
methacryloxymethyl triethoxysilane,
acryloxymethyl trimethoxysilane, and
acryloxymethyl triethoxysilane.

Specific examples of the epoxy functional silane coupling agent include:

3-glycidoxypropyl trimethoxysilane,
3-glycidoxypropyl triethoxysilane,
2-(3,4-epoxycyclohexyl)ethyl trimethoxysilane,
2-(3,4-epoxycyclohexyl)ethyl triethoxysilane,
γ-glycidoxypropyl trimethoxysilane, and
γ-glycidoxypropyl methyldiethoxysilane.

Specific examples of the vinyl functional silane coupling agent include:

vinyl trimethoxysilane, vinyl triethoxysilane, and
vinyl tris(β-methoxyethoxy)silane.

Specific examples of the amino (imino) functional silane coupling agent include:

amino and/or imino group-containing alkoxysilane, such as H$_2$NCH$_2$CH$_2$CH$_2$Si(OCH$_3$)$_3$, H$_2$NCH$_2$CH$_2$NHCH$_2$CH$_2$CH$_2$Si(OCH$_3$)$_3$, H$_2$NCH$_2$CH$_2$NHCH$_2$CH$_2$CH$_2$Si(CH$_3$)(OCH$_3$)$_2$, and (C$_2$H$_5$O)$_3$Si(CH$_2$)$_3$NH(CH$_2$)$_2$NH(CH$_2$)$_3$Si(OH$_2$H$_5$)$_3$;

reaction products of the amino and/or imino group-containing alkoxysilane and an epoxysilane compound represented, for example, by the following formulas:

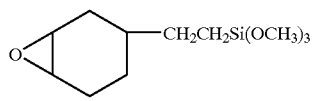

reaction products of the amino and/or imino group-containing alkoxysilane and a methacryloxysilane compound, such as CH$_2$=C(CH$_3$)COOCH$_2$CH$_2$CH$_2$Si(OCH$_3$)$_3$, and CH$_2$=C(CH$_3$)COOCH$_2$CH$_2$CH$_2$Si(OCH$_2$CH$_2$OCH$_3$)$_3$; and N-phenyl-γ-aminopropyltrimethoxysilane.

Among these silane coupling agents, preferable are:

vinyl functional silane coupling agents, such as vinyl trimethoxysilane, vinyl triethoxysilane, and vinyl tris (β-methoxyethoxy)silane;

epoxy functional silane coupling agents, such as 3-glycidoxypropyl trimethoxysilane, 3-glycidoxypropyl triethoxysilane, 2-(3,4-epoxycyclohexyl)ethyl trimethoxysilane, 2-(3,4-epoxycyclohexyl)ethyl triethoxysilane, γ-glycidoxypropyl trimethoxysilane, γ-glycidoxypropyl methyldiethoxysilane, and N-phenyl-γ-aminopropyl trimethoxysilane; and (meth)acryl functional silane coupling agents, such as 3-methacryloxypropyl trimethoxysilane, and 3-methacryloxypropyl triethoxysilane.

The silane coupling agent (E) is used in an amount of preferably 0.01 to 10 parts by weight, more preferably 0.1 to 5 parts by weight, based on the sum 100 parts by weight of the ethylene/α-olefin/non-conjugated polyene random copolymer rubber (A) and the SiH group-containing compound (B).

Plasticizer (F)

The plasticizer (F) is optionally used together with the catalyst (C), for example, a softener generally used for rubbers is employable.

Specific examples of the plasticizer include:

petroleum softeners, such as paraffin process oils, naphthene process oils, aromatic process oils, an ethylene/α-olefin cooligomer, paraffin wax, liquid paraffin, white oil, petrolatum, lubricating oil, oil asphalt, and vaseline;

coal tar softeners, such as coal tar, and coal tar pitch;

aliphatic softeners, such as castor oil, linseed oil, rapeseed oil, and coconut oil;

tall oil;

synthetic polymer substances, such as petroleum resin, atactic polypropylene, and coumarone-indene resin; and phthalic acid derivatives, isophthalic acid derivatives, tetrahydrophthalic acid derivatives, adipic acid derivatives, azelaic acid derivatives, sebacic acid derivatives, dodecane-2-acid derivatives, maleic acid derivatives, fumaric acid derivatives, trimellitic acid derivatives, pyromellitic acid derivatives, citric acid derivatives, itaconic acid derivatives, oleic acid derivatives, ricinoleic acid derivatives, stearic acid derivatives, phosphoric acid derivatives, sulfonic acid derivatives, glycerin derivatives, glutaric acid derivatives, epoxy derivatives, glycol derivatives, paraffin derivatives, and silicone oils.

Among these, preferable are the ethylene/α-olefin cooligomer, process oils, and paraffin derivatives which do not inhibit the silylation. Particularly preferable are paraffin process oils and an ethylene/α-olefin cooligomer.

The plasticizer (F) is used in an amount of 0 to 1,000 parts by weight, usually 1 to 1,000 parts by weight, preferably 5 to 800 parts by weight, more preferably 10 to 700 parts by weight, even more preferably 20 to 500 parts by weight, highly preferably 30 to 300 parts by weight, based on 100 parts by weight of the ethylene/α-olefin/non-conjugated polyene random copolymer rubber (A).

The use of the plasticizer (F) in the above amount leads to improvement in flowability and, therefore, moldability. The use of the plasticizer (F) in an amount exceeding 1,000 parts by weight deteriorates the strength properties, and is therefore unfavorable.

Other Components

The second to the fourth crosslinkable rubber compositions of the present invention can be used in an uncrosslinked state. They, however, exhibit their properties most conspicuously when used as a crosslinked product such as a crosslinked rubber molded product and a crosslinked rubber expanded (foamed) product.

The second to the fourth crosslinkable rubber compositions of the invention may contain, according to the intended uses thereof, known additives, such as a rubber reinforcing agent, an inorganic filler, an anti-aging agent, a processing aid, a vulcanization accelerator, an organic peroxide, a crosslinking aid, a foaming agent, a foaming aid, a colorant, a dispersant, and a flame retardant, within the limit not detrimental to the objects of the present invention.

The rubber reinforcing agent functions to enhance mechanical properties of the crosslinked rubbers, such as tensile strength, tear strength, and abrasion resistance. As the reinforcing agents, there can be mentioned carbon blacks, such as SRF, GPF, FEF, HAF, ISAF, SAF, FT and MT; the above carbon blacks surface-treated with a silane coupling agent or the like; finely divided silicic acid; and silica.

Examples of silica include fumed silica, and precipitated silica. The silica may be surface treated with reactive silane, such as hexamethyldisilazane, chlorosilane, and alkoxysilane; or low-molecular weight siloxane. The specific surface area (BED method) of the silica is preferably 50 $m^2/g$ or more, more preferably 100 to 400 $m^2/g$.

The type and the amount of the rubber reinforcing agent, can be appropriately determined according to its application. The rubber reinforcing agent is used in an amount of usually up to 300 parts by weight maximum, preferably up to 200 parts by weight maximum, based on 100 parts by weight of the ethylene/α-olefin/non-conjugated polyene random copolymer rubber (A).

As the inorganic fillers, there can be mentioned light calcium carbonate, heavy calcium carbonate, talc, and clay.

The type and the amount of the inorganic filler can be appropriately determined according to its application. The inorganic filler is used in an amount of usually up to 300 parts by weight maximum, preferably up to 200 parts by weight maximum, based on 100 parts by weight of the ethylene/α-olefin/non-conjugated polyene random copolymer rubber (A).

As the anti-aging agent, there can be mentioned those of amine type, hindered phenol type and sulfur type. The anti-aging agent is used in an amount not detrimental to the objects of the present invention.

The amine type anti-aging agent for use in the present invention are, for example, diphenylamines and phenylenediamines.

Examples of the diphenylamines include p-(p-toluenesulfonylamido)-diphenylamine, 4,4'-(α,α-dimethylbenzyl)diphenylamine, 4,4'-dioctyldiphenylamine, a high-temperature reaction product of diphenylamine and acetone, a low-temperature reaction product of diphenylamine and acetone, a low-temperature reaction product of diphenylamine, aniline and acetone, a reaction product of diphenylamine and diisobutylene, octylated diphenylamine, dioctylated diphenylamine, p,p'-dioctyldiphenylamine, and alkylated diphenylamine.

Examples of the phenylenediamines include p-phenylenediamines, such as N,N'-diphenyl-p-phenylenediamine, n-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-pheylenediamine, N,N'-bis(1,4-dimethylpentyl)-p-phenylenediamine, N,N'-bis(1-ethyl-3-methylpentyl)-p-phenylenediamine, N-(1,3-dimethylbutyl)-N'-phenyl-p-phenylenediamine, phenylhexyl-p-phenylenediamine, and phenyloctyl-p-phenylenediamine.

Among these, particularly preferable are 4,4'-(α,α-dimethylbenzyl)diphenylamine and N,N'-di-2-naphthyl-p-phenylenediamine.

These compounds can be used singly or in combination of 2 or more kinds.

Examples of the hindered phenol type anti-aging agent include:

(1) 1,1,3-tris-(2-methyl-4-hydroxy-5-t-butylphenyl) butane, (2) 4,4'-butylidenebis-(3-methyl-6-t-butylphenol), (3) 2,2-thiobis(4-methyl-6-t-butylphenol), (4) 7-octadecyl-3-(4'-hydroxy-3',5'-di-t-butylphenyl) propionate, (5) tetrakis-(methylene-3-(3',5'-di-t-butyl-4'-hydroxyphenyl)propionate)methane, (6) pentaerythritol-tetrakis(3-(3,5-di-t-butyl-4-hydroxyphenyl)propionate), (7) triethylene glycol-bis(3-(3-t-butyl-5-methyl-4-hydroxyphenyl)propionate), (8) 1,6-hexanediol-bis(3-(3,5-di-t-butyl-4-hydroxyphenyl)propionate), (9) 2,4-bis(n-octylthio)-6-(4-hydroxy-3,5-di-t-butylanilino)-1,3,5-triazine,

(10) tris-(3,5-di-t-butyl-4-hydroxybenzyl)-isocyanurate,

(11) 2,2-thio-diethylenebis(3-(3,5-di-t-butyl-4-hydroxyphenyl)propionate),

(12) N,N'-hexamethylenebis(3,5-di-t-butyl-4-hydroxy)-hydrocinnamide,

(13) 2,4-bis((octylthio)methyl)-o-cresol,

(14) 3,5-di-t-butyl-4-hydroxybenzyl-phosphonate-diethyl ester,

(15) tetrakis(methylene(3,5-di-t-butyl-4-hydroxyhydrocinnamate))methane,

(16) octadecyl-3-(3,5-di-t-butyl-4-hydroxyphenyl) propionate, and

(17) 3,9-bis(2-(3-(3-t-butyl-4-hydroxy-5-methylphenyl) propionyloxy)-1,1-dimethylethyl)-2,4-8,10-tetraoxaspiro(5,5)undecane.

Of these, preferable are the phenol compounds (5) and (17).

Examples of the sulfur type anti-aging agent include those generally used in rubbers.

Specific examples of the sulfur type anti-aging agent include:

imidazole type anti-aging agents, such as 2-mercaptobenzimidazole, zinc salt of 2-mercaptobenzimidazole, 2-mercaptomethylbenzimidazole, zinc salt of 2-mercaptomethylbenzimidazole and zinc salt of 2-mercaptomethylimidazole; and aliphatic thioether type anti-aging agents, such as dimyristyl thiodipropionate, dilauryl thiodipropionate, distearyl thiodipropionate, ditridecyl thiodipropionate and pentaerythritol-tetrakis-(β-lauryl-thiopropionate). Among these, preferable are 2-mercaptobenzimidazole, zinc salt of 2-mercaptobenzimidazole, 2-mercaptomethylbenzimidazole, zinc salt of 2-mercaptomethylbenzimidazole and pentaerythritol-tetrakis-(β-lauryl-thiopropionate).

As the processing aid, compounds generally used in rubbers are employable.

Examples of the processing aid include:

higher fatty acids, such as ricinoleic acid, stearic acid, palmitic acid, and lauric acid;

salts of higher aliphatic acids, such as barium stearate, zinc stearate and calcium stearate; and esters of higher fatty acids, such as ricinoleic acid, stearic acid, palmitic acid and lauric acid.

The processing aid is used in an amount of usually 10 parts by weight or less, preferably 5 parts by weight or less, based on 100 parts by weight of the ethylene/α-olefin/non-conjugated polyene random copolymer rubber (A). The optimum amount thereof is appropriately determined in accordance with the required property values.

In this invention, an organic peroxide may be used in addition to the catalyst (C) to conduct both of addition crosslinking and radical crosslinking. The organic peroxide is used in an amount of about 0.1 to about 10 parts by weight based on 100 parts by weight of the ethylene/α-olefin/non-conjugated polyene random copolymer rubber (A). As the organic peroxides for use herein, conventional organic peroxides usually employed in rubber crosslinking are employable.

When the organic peroxide is used, a crosslinking assistant is preferably used in combination.

Examples of the crosslinking assistant include: sulfur; quinon dioxime compounds, such as p-quinon dioxime; methacrylate compounds, such as polyethylene glycol dimethacrylate; allyl compounds, such as diallyl phthalate, and triallyl cyanurate; maleimide compounds; and divinylbenzene.

The crosslinking assistant is used in an amount of 0.5 to 2 mol based on 1 mol of the organic peroxide to be used, preferably about equimolar amount.

As the foaming agent, there can be mentioned:

inorganic foaming agents, such as sodium bicarbonate, sodium carbonate, ammonium bicarbonate, ammonium carbonate, and ammonium nitrite;

nitroso compounds, such as N,N'-dimethyl-N,N'-dinitrosoterephthalamide, and N,N'-dinitrosopentamethylenetetramine;

azo compounds, such as azodicarbonamide, azobisisobutyronitrile, azocyclohexylnitrile, azodiaminobenzene, and barium azodicarboxylate;

sulfonyl hydrazide compounds, such as benzenesulfonyl hydrazide, toluenesulfonyl hydrazide, p,p'-oxybis (benzenesulfonyl hydrazide), and diphenylsulfone-3,3'-disulfonyl hydrazide;

azide compounds, such as calcium azide, 4,4-diphenyldisulfonyl azide, and p-toluenesulfonyl azide; and gases, such as carbon dioxide, nitrogen, oxygen, and chlorofluorocarbons.

The foaming agent is used in an amount of 0.5 to 30 parts by weight, preferably 1 to 20 parts by weight, based on 100 parts by weight of the ethylene/α-olefin/non-conjugated polyene random copolymer rubber (A). The use of the foaming agent in the above amount enables production of a foamed product having an apparent specific gravity of 0.03 to 0.8 g/cm$^3$. The optimum amount thereof is appropriately determined in accordance with the required property values.

A foaming aid may be used in combination with the foaming agent if necessary. The foaming aid has functions of lowering the decomposition temperature of the foaming agent, accelerating the decomposition, and uniformalization of air bubbles.

Examples of the foaming aid include organic acids, such as salicylic acid, phthalic acid, stearic acid, and oxalic acid; urea and derivatives thereof. The foaming aid is used in an amount of 0.01 to 10 parts by weight, preferably 0.1 to 5 parts by weight, based on 100 parts by weight of the ethylene/α-olefin/non-conjugated polyene random copolymer rubber (A). The optimum amount thereof is appropriately determined in accordance with the required property values.

According to the present invention, known rubbers may be blended in the second to the fourth crosslinkable rubber compositions within the limit not detrimental to the objects of the invention.

Examples of such rubbers include natural rubber (NR), isoprene rubbers such as isoprene rubber (IR); and conjugated diene rubbers, such as butadiene rubber (BR), styrene-butadiene rubber (SBR), acrylonitrile-butadiene rubber (NBR), and chloroprene rubber (CR).

Hitherto known ethylene/α-olefin copolymer rubbers can also be used. For example, an ethylene/propylene random copolymer (EPR), and an ethylene/α-olefin/polyene copolymer (EPDM or the like) other than the ethylene/α-olefin/non-conjugated polyene random copolymer rubber (A), are usable.

Rubber Compositions and uses Thereof

The first to the fourth crosslinkable rubber compositions of this invention are used for electric and electronic parts, transportation machines, civil engineering and construction items, medical appliances and goods for leisure activities.

Uses for the electric and electronic parts include sealing, potting and coating materials and adhesives respectively applied to heavy electric apparatus parts, light electrical appliance parts, or circuits and substrates of electric and electronic machinery and tools; repairing materials for covered electric wire; insulating sealing materials for electric wire joint parts; rolls for office automation equipments; vibration absorbing materials; and gels or encapsulation materials for condensers.

The sealing materials are suitably used for refrigerators, freezers, washing machines, gas meters, microwaves, steam irons and circuit breakers.

The potting materials are suitably used for potting transformer high-tension circuits, printed boards, high voltage transformers equipped with a variable resistor, electric insulating parts, semi-conductive parts, conductive parts, solar cells, and TV fly-back transformers.

The coating materials are suitably used for coating circuit elements, such as a high voltage thick film resistor and a hybrid IC; HIC; electrical insulating parts; semi-conductive parts; conductive parts; modules; printed circuits; ceramic boards; buffer materials for diodes, transistors and bonding wires; semi-conductive elements; and optical fibers for optical communication.

The adhesives are suitably used for bonding cathode-ray tube wedges or necks, electric insulating parts, semi-conductive parts and conductive parts.

The transportation machines include automobiles, ships, airplanes and railway vehicles.

Uses for the automobiles include sealing materials for gaskets of automobile engines, electric trim parts and oil filters; potting materials for an ignitor HIC and automotive hybrid IC; coating materials for automobile bodies, automobile window glass and engine control substrates; and adhesives for gaskets of oil pans, timing belt covers, automotive moles, head lamp lenses, sun roof seals and mirrors.

Uses for the ships include sealing materials for wire connecting distributor boxes, electric system parts and electric wires; and adhesives for electric wires and glass.

Uses for the civil engineering and construction include sealants of building materials for butte joints in glass screen method of commercial buildings, joints of glass fringes fixed with sash, interior finishing joints of toilet facilities, lavatory and show cases, joints of bath tub circumferences, outer wall extension joints of-prefabrication houses, and joints of siding boards; sealing materials for double glazing units; civil engineering sealants used in road maintenance; coatings and adhesives for metals, glass, stones, slates, concretes and tiles; adhesive sheets; water proofing sheets; and vibration-proof sheets.

Uses for medical appliances include sealing materials for medicinal rubber stoppers, syringe gaskets and rubber stoppers for reducing blood pressure.

Uses for the goods for leisure activities include swimming materials, such as swimming caps, diving masks and earplugs; and gel buffer materials for sport shoes and baseball gloves.

The first to the fourth crosslinkable rubber compositions of the present invention can be suitably used as sealing, potting and coating materials and adhesives respectively applied to electric and electronic parts, transportation machines, civil engineering and construction materials, medical appliances and goods for leisure activities.

Preparation of Rubber Compositions and Crosslinked Rubber Molded Products Thereof As mentioned above, the second to the fourth crosslinkable rubber compositions of the present invention can be used in an uncrosslinked state. They, however, exhibit their properties most conspicuously when used as a crosslinked product (vulcanized product) such as a crosslinked rubber molded product and a crosslinked rubber foamed product.

The crosslinked product from any of the second to the fourth crosslinkable rubber compositions of the invention may be produced, as in the usual room temperature-crosslinkable rubber (RTV rubber), by mixing the ethylene/α-olefin/non-conjugated polyene random copolymer rubber (A), the SiH group-containing compound (B), and optionally, the catalyst (C), the reaction inhibitor (D), the silane coupling agent (E) and the plasticizer (F), and according to the intended use of the crosslinked product, conventional additives, such as a rubber reinforcing agent, an inorganic filler, an anti-aging agent, a processing aid, a vulcanization accelerator, an organic peroxide, a crosslinking assistant, a foaming agent, a foaming aid, a colorant, a dispersant, and a flame retardant; molding the compounded rubber into a desired shape by filling it in a gap, applying it between objects, coating it on an object, or potting an object into it; and allowing it to stand at room temperature to conduct crosslinking (vulcanizing). Heating may be performed to accelerate the crosslinking reaction.

Specifically, the second to the fourth crosslinkable rubber compositions of the present invention can be prepared by mixing the ethylene/α-olefin/non-conjugated polyene random copolymer rubber (A), the SiH group-containing compound (B), and optionally, the catalyst (C), the reaction inhibitor (D), the silane coupling agent (E) and the plasticizer (F), and according to the intended use of the crosslinked product, conventional additives, such as a rubber reinforcing agent, an inorganic filler, an anti-aging agent, a processing aid, a vulcanization accelerator, an organic peroxide, a crosslinking assistant, a foaming agent, a foaming aid, a colorant, a dispersant, and a flame retardant, by using a kneading apparatus, such as a planetary mixer and a kneader.

According to the present invention, the ethylene/α-olefin/non-conjugated polyene random copolymer rubber (A) can be mixed with the rubber reinforcing agent, the inorganic filler and the like at high temperatures. Meanwhile, when the SiH group-containing compound (B) and the catalyst (C) are mixed simultaneously at high temperatures, crosslinking (scorching) might occur. Therefore, if the SiH group-containing compound (B) and the catalyst (C) are mixed at the same time, the kneading is preferably conducted at a temperature of 80° C. or below. When the SiH group-containing compound (B) and the catalyst (C) is added to the composition one by one, the kneading is carried out at a temperature exceeding 80° C. It is preferable in some cases to cool down the heat generated by the kneading with water.

The thus prepared second to the fourth crosslinkable rubber compositions of the invention are molded into a desired shape when they are filled in a gap, applied between objects, coated on an object, or when an object is potted therein, otherwise by various molding methods using an extruder, a calendar roller, a press, an injection molding machine, a transfer molding machine, etc. The thus molded product is allowed to stand at room temperature to conduct crosslinking, whereby a desired crosslinked product (crosslinked rubber molded product) can be obtained. Further, heating may be performed to accelerate the crosslinking reaction.

EFFECT OF THE INVENTION

The first crosslinkable rubber composition of the present invention has a high crosslinking rate at room temperature, excellent adhesion, especially with an inorganic substance such as metals, and is capable of producing crosslinked rubber molded products (including foamed products) with satisfactory productivity. The products have high tensile elongation, and are excellent in weather, ozone, heat aging and compression set resistances and in resistance to gas permeability.

The second to the fourth crosslinkable rubber compositions of the present invention have a high crosslinking rate at room temperature and excellent productivity, excellent adhesion, especially with an inorganic substance such as metals, and are capable of producing, at low cost, crosslinked rubber molded products (including foamed products) excellent in weather, ozone, heat aging and compression set resistances and in resistance to gas permeability.

The first to the fourth crosslinkable rubber compositions of the present invention are preferably employed, by virtue of the above-noted properties, for uses involving electric and electronic parts, transportation machines, civil engineering and construction materials, medical appliances and goods for leisure activities. Specific uses thereof are described hereinbefore. These rubber compositions have excellent moldability and adhesion in addition to the above properties, and are therefore preferable as a sealing material or the like.

EXAMPLES

Hereinafter, the present invention will be described in more detail with reference to the following examples, however, they are not intended to limit the scope thereof.

With regard to the copolymer rubbers used in the examples and comparative examples, the composition, iodine value, intrinsic viscosity [η], molecular weight distribution (Mw/Mn), effective network chain density (ν) and adhesion strength were determined with the following measurements.

(1) Composition of Copolymer Rubber

The composition of a copolymer rubber was measured by the $^{13}$C-NMR method.

(2) Iodine Value of Copolymer Rubber

The iodine value of a copolymer rubber was determined with the titration method.

(3) Intrinsic Viscosity [η] of Copolymer Rubber

The intrinsic viscosity of a copolymer rubber was measured in decalin at 135° C.

(4) Molecular Weight Distribution (Mw/Mn)

The molecular weight distribution of a copolymer rubber was represented by the ratio (Mw/Mn) of a weight average molecular weight (Mw) to a number average molecular weight (Mn), determined by GPC. In GPC, GMH-HT and GMH-HTL (manufactured by Tosoh Co. Ltd.) were used as columns and orthodichlorobenzene was used as a solvent.

(5) Effective Network Chain Density (ν)

A polymer rubber was immersed in toluene at 37° C. for 72 hr according to JIS K6258 (1993) and the effective network chain density was determined by the Flory-Rehner equation.

$$\nu(\text{chains/cm}^3) = v_R + \ln(1-v_R) + \mu v_R^2 / -V_0(v_R^{1/3} - v_R/2)$$

$v_R$: a fraction of a pure rubber volume to a volume of a pure rubber swelled (pure rubber volume+absorbed solvent volume) in a crosslinked rubber swelled.

$\mu$: a constant of rubber-solvent interaction=0.49

$V_0$: molar volume of a solvent.

ν: effective network chain density. The number of effective network chains in 1 cm$^3$ of the pure rubber.

Preparation of sample: 0.01 mol of dicumylperoxide was added to 100 g of a copolymer rubber and kneaded at a kneading temperature of 50° C. using a 8-inch roll open mill rolls in accordance with the method described in Society of Rubber Industry, Japan Standards (SRIS), and the resulting kneadate was crosslinked with press at 170° C. for 10 min to prepare a sample.

(6) Adhesion Strength

The composition as shown in below was prepared and the adhesion strength thereof was measured in accordance with the tensile adhesive test JIS A 5758(1986). As curing conditions, reactive curing 2-component type one was employed. Aluminum was selected as the adherend.

<Process for Preparing Composition>

Using a 2-liter planetary mixer (manufactured by Inoue Seisakusho, Co., 100 parts by weight of one of various polymers and 20 parts by weight of carbon black (Trade Mark Asahi#60G, manufactured by Asahi Carbon Co. were kneaded at 80° C. for 20 min. The filling rate was 50%. The resulting blend was cooled to room temperature, and then kneaded with 3 parts by weight of tris(dimethylhydrosiloxy) phenyl silane [C$_6$H$_5$—Si(O—SiH—(CH$_3$)$_2$)$_3$] at room temperature for 10 min and thereafter kneaded with 0.1 part by weight of hexachloro-platinic acid (2% isopropanol solution) at room temperature for 5 min to prepare a composition.

Preparation Example 1

[Preparation of Ethylene/propylene/5-vinyl-2-norbornene Random Copolymer Rubber (A-1)]

Using a 100-litter substantially internal volume-having stainless polymerizer equipped with stirring blades (number for revolutions=250 rpm), terpolymerization of ethylene, propylene and 5-vinyl-2-norbornene was carried out continuously. From the side inlet of the polymerizer, 60 l/hr of hexane, 3.0 Kg/hr of ethylene, 9.0 Kg/hr of propylene and 550 g/hr of 5-vinyl-2-norbornene, 50 l/hr of hydrogen and, as a catalyst, 95 mmol of VOCl$_3$, 443 mmol of Al(Et)$_2$Cl and 127 mmol/hr of Al(Et)$_{1.5}$Cl$_{1.5}$ were fed to a liquid phase continuously.

Carrying out copolymerization in the above-mentioned conditions, ethylene/propylene/5-vinyl-2-norbornene random copolymer rubber (A-1) was prepared in a uniform solution state.

Thereafter, a small amount of methanol was added to the polymerization solution continuously drawn out from the bottom of the polymerizer to stop the polymerization reaction. The polymer was separated from the solvent by a steam stripping treatment, and then dried in vacuo at 55° C. for 48 hr. The physical properties of the ethylene/propylene/5-vinyl-2-norbornene random is copolymer rubber (A-1) thus prepared are shown in Table 1.

Preparation Examples 2–3

The procedure of Preparation Example 1 was repeated except that the polymerization conditions were changed to those as shown in Table 1 to prepare ethylene/propylene/5-vinyl-2-norbornene random copolymer rubbers (A-2) and (A-3) having different properties. The physical properties of the resulting copolymer rubbers (A-2) and (A-3) are shown in Table 1.

TABLE 1

| Copolymer rubber | A-1 | A-2 | A-3 |
| --- | --- | --- | --- |
| Catalyst | VOCl$_3$—Al(Et)$_2$Cl/ Al(Et)$_{1.5}$Cl$_{1.5}$ | VOCl$_3$—Al(Et)$_2$Cl/ Al(Et)$_{1.5}$Cl$_{1.5}$ | VOCl$_3$—Al(Et)$_2$Cl/ Al(Et)$_{1.5}$Cl$_{1.5}$ |
| Al/V | 6 | 6 | 6 |
| Al(Et)$_2$Cl/ Al(Et)$_{1.5}$Cl$_{1.5}$ | 7/2 | 7/2 | 7/2 |

TABLE 1-continued

| Copolymer rubber | A-1 | A-2 | A-3 |
|---|---|---|---|
| Polymerization temperature (° C.) | 40 | 40 | 40 |
| Polymerization pressure (kgf/cm$^2$) | 7.1 | 7.1 | 7.2 |
| Catalyst feeding (mmol/h) | 95 | 45 | 90 |
| Diene | VNB | VNB | VNB |
| Diene feeding (g/h) | 550 | 330 | 550 |
| α-olefin | Propylene | Propylene | Propylene |
| Ethylene/α-olefin feeding (Kg/h) | 3.0/9.0 | 3.0/9.5 | 2.8/11.5 |
| H$_2$ (NL/h) | 70 | 50 | 40 |
| Yield (Kg/h) | 3.5 | 4.5 | 4.1 |
| Ethylene content (mol %) | 68 | 68 | 63 |
| [η] (dl/g) | 0.2 | 0.7 | 1.1 |
| IV (g/100 g) | 15 | 10 | 15 |
| Mw/Mn | 15 | 28 | 40 |
| Effective network chain density ν (× 10$^{19}$ chains/cm$^3$) | 0.8 | 1.2 | 2.5 |

Note
1) VNB: 5-vinyl-2-norbornene
2) Et: Ethoxy group
3) IV: Iodine value

Example 1

Firstly, 100 parts by weight of ethylene/α-olefin/non-conjugated polyene random copolymer rubber (A-1), 4.3 parts by weight of $C_6H_5Si(-OSiMe_2H)_3$ (B) (manufactured by Shinetsu Chemical Industries Co.) and 0.3 part by weight of 2% isopropyl alcohol solution of chloroplatinic acid (C) as shown in Table 1 were kneaded at room temperature using a laboratory plastomill to prepare a compounded rubber.

The resulting compounded rubber was subjected to a gelation test and the gelation time at room temperature was measured. The results are shown in Table 3.

Further, the resulting compounded rubber was casted to a metallic frame in 2 mm depth and thereafter was allowed to stand at room temperature for 3 days to prepare a 2 mm thick crosslinked sheet.

With regard to the resulting crosslinked sheet, a tensile test and ozone deterioration test were carried out in accordance with the following manners.

(1) Gelation Test

The change in frequency was measured using a scanning VNC (SVNC) (manufactured by Rapra Technology Ltd.). The frequency increased with proceeding of this measurement, and when it stabilized, it was taken to be 100%. The time that the frequency changed 95% was taken as the gelation time (crosslinking time). The measuring temperature was room temperature and the measuring procedure was carried out according to the following literatures.

(i) RAPRA Operation manual (Software Ver. 2.2) of Scanning vibrating needle type curemeter (scanning VNC)
  (ii) RAPRA Curing comprehension (RTL/2844) Scanning vibrating needle type curemeter (scanning VNC).

(2) Tensile Test

The tensile test was carried out at a measuring temperature of 23° C. at a tensile rate of 500 mm/min in accordance with JIS K-6251, and when the crosslinked sheet was broken, tensile strength at break TB and tensile elongation $E_B$ were measured.

(3) Ozone Deterioration Test

The ozone deterioration test was carried out in accordance with JIS K-5259. The test conditions are 40° C., 50 pphm of ozone concentration and 96 hr.

These results are shown in Table 2.

The adhesion strength of the composition of ethylene/α-olefin/non-conjugated polyene random copolymer rubber (A-1) to aluminum was measured in accordance with the above method. As a result, the adhesion strength was 1.5 MPa.

Example 2

The procedure of Example 1 was repeated except that ethylene/propylene/5-vinyl-2-norbornene random copolymer rubber (A-2) as shown in Table 1 was used in place of ethylene/propylene/5-vinyl-2-norbornene random copolymer rubber (A-1), and 120 parts by weight of a plasticizer (F) [manufactured by Idemitsu Kosan Co. Ltd. TradeMark: Idemitsu Diana process Oil PW-32] was added. The results are shown in Table 2.

The adhesion strength of the composition of ethylene/α-olefin/non-conjugated polyene random copolymer rubber (A-2) to aluminum was measured in accordance with the above method. As a result, the adhesion strength was 2.5 MPa.

Example 3

The procedure of Example 1 was repeated except that ethylene/propylene/5-vinyl-2-norbornene random copolymer rubber (A-3) as shown in Table 1 was used in place of ethylene/propylene/5-vinyl-2-norbornene random copolymer rubber (A-1), and 300 parts by weight of a plasticizer (F) [manufactured by Idemitsu Kosan Co. Ltd. TradeMark: Idemitsu Diana process Oil PW-32] was added. The results are shown in Table 2.

The adhesion strength of the composition of ethylene/α-olefin/non-conjugated polyene random copolymer rubber (A-3) to aluminum was measured in accordance with the above method. As a result, the adhesion strength was less than 0.1 MPa

Example 4

The procedure of Example 2 was repeated except that 0.01 part by weight of ethynylcyclohexanol (D) and 5 parts by weight of 3-glycidoxypropyl trimethoxysilane (E) were added. The results are shown in Table 2.

Example 5

The procedure of Example 3 was repeated except that the amount of the plasticizer (F) was changed from 300 parts by weight to 400 parts by weight, and 0.01 part by weight of ethynylcyclohexanol (D), 5 parts by weight of 3-glycidoxypropyl trimethoxysilane (E) and 50 parts by weight of silica [manufactured by Nippon Aerosil Co. Ltd. Trade Name Aerosil 200] were added. The results are shown in Table 2.

Comparative Example 1

The procedure of Example 1 was repeated except that ethylene/propylene/5-ethylidene-2-norbornene random copolymer rubber (A-4) [Trade Name Mitsui EPT X-4010, manufactured by Mitsui Chemicals Inc.] was used in place of ethylene/propylene/5-vinyl-2-norbornene random copolymer rubber (A-1). The results are shown in Table 2.

Comparative Example 2

The procedure of Example 1 was repeated except that ethylene/propylene/dicyclopentadiene copolymer rubber (A-5) [Trade Name Mitsui EPT X-3012P, manufactured by Mitsui Chemicals Inc.] was used in place of ethylene/propylene/5-vinyl-2-norbornene random copolymer rubber (A-1). The results are shown in Table 2.

Comparative Example 3

The procedure of Example 1 was repeated except that polyisoprene copolymer rubber (A-6) prepared in the following manner was used in place of ethylene/propylene/5-vinyl-2-norbornene random copolymer rubber (A-1). The results are shown in Table 2.

Preparation of Polyisoprene Copolymer Rubber (A-6):

To a reaction vessel charged with 300 g of a hydrogenated polyisoprene having hydrosilyl groups at both ends [Idemitsu Petrochemicals Co. Ltd., Trade Mark: Epol], 50 ml of toluene was added, and dehydrated with azeotropic deaeration, and thereafter a solution prepared by dissolving 48 g of t-BuOK in 200 ml of THF was injected.

The hydrogenated polyisoprene and t-BuOK were reacted at 50° C. for 1 hr, and 47 ml of allyl chloride was added dropwise to the reaction liquid over about 30 min. After the completion of the dropwise addition, 30 g of aluminum silicate was added to the reaction liquid in order to absorb the salt produced, and stirred at room temperature for 30 min.

Then, the mixture was purified with filtration to dim, prepare about 250 g of hydrogenated polyisoprene having terminal allyl groups. The iodine value thereof determined by the iodine titration method was 0.1 mol/100 g.

Comparative Example 4

The procedure of Example 2 was repeated except that 2.7 parts by weight of 100% dicumyl peroxide was used in place of 4.3 parts by weight of $C_6H_5Si(-OSiMe_2H)_3$ (B) (manufactured by Shinetsu Chemical Industries Co.) and 0.3 part by weight of 2% isopropyl alcohol solution of chloroplatinic acid (C). The results are shown in Table 2.

Comparative Example 5

The procedure of Example 2 was repeated except that 1.5 parts by weight of sulfur (vulcanizer), 0.5 part by weight of 2-mercaptobenzothiazole [manufactured by Sanshin Chemical Industries Co. Ltd., Trade Name Sanceler M], 1.0 part by weight of tetramethylthiuram disulfide [manufactured by Sanshin Chemical Industries Co. Ltd., Trade Name Sanceler TT], 5 parts by weight of zinc white and 1 part by weight of a stearic acid were used in place of 4.3 parts by weight of $C_6H_5Si(-OSiMe_2H)_3$ (B) (manufactured by Shinetsu Chemical Industries Co.) and 0.3 part by weight of 2% isopropyl alcohol solution of chloroplatinic acid (C). The results are shown in Table 2.

TABLE 2-1

| | Example | | | | |
|---|---|---|---|---|---|
| | 1 | 2 | 3 | 4 | 5 |
| Composition [parts by weight] | | | | | |
| Copolymer rubber (A-1) | 100 | | | | |
| Copolymer rubber (A-2) | | 100 | | 100 | |
| Copolymer rubber (A-3) | | | 100 | | 100 |
| Copolymer rubber (A-4) | | | | | |
| Copolymer rubber (A-5) | | | | | |
| Copolymer rubber (A-6) | | | | | |
| $C_6H_5Si(-OSiMe_2H)_3$ (B) | 4.3 | 4.3 | 4.3 | 4.3 | 4.3 |
| 2% IPA solution of chloroplatinic acid (C) | 0.3 | 0.3 | 0.3 | 0.3 | 0.3 |
| Ethynyl cyclohexanol (D) | | | | 0.01 | 0.01 |
| 3-GPTMS (E) | | | | 5 | 5 |
| PW-32 (F) | | 120 | 300 | 120 | 400 |
| Dicumyl peroxide | | | | | |
| Sulfur | | | | | |
| Sanceler-M | | | | | |
| Sanceler-TT | | | | | |
| Zinc white | | | | | |
| Stearic acid | | | | | |
| Aerosil 200 | | | | | 50 |
| Crosslinking rate ($t_c(90)$) [min] | 15 | 21 | 29 | 39 | 52 |

TABLE 2-1-continued

| | Example | | | | |
|---|---|---|---|---|---|
| | 1 | 2 | 3 | 4 | 5 |
| Ozone resistance | No cracking | No cracking | No cracking | No cracking | No cracking |
| $T_B$ [MPa] | 0.3 | 0.4 | 0.4 | 0.4 | 0.8 |
| $E_B$ [%] | 60 | 250 | 380 | 300 | 240 |

TABLE 2-2

| | Comparative Example | | | | |
|---|---|---|---|---|---|
| | 1 | 2 | 3 | 4 | 5 |
| Composition [part by weight] | | | | | |
| Copolymer rubber (A-1) | | | | | |
| Copolymer rubber (A-2) | | | | 100 | 100 |
| Copolymer rubber (A-3) | | | | | |
| Copolymer rubber (A-4) | 100 | | | | |
| Copolymer rubber (A-5) | | 100 | | | |
| Copolymer rubber (A-6) | | | 100 | | |
| $C_6H_5Si(-OSiMe_2H)_3$ (B) | 4.3 | 4.3 | 4.3 | | |
| 2% IPA solution of chloroplatinic acid (C) | 0.3 | 0.3 | 0.3 | | |
| Ethynyl cyclohexanol (D) | | | | | |
| 3-GPTMS (E) | | | | | |
| PW-32 (F) | | | | 120 | 120 |
| Dicumyl peroxide | | | | 3.5 | |
| Sulfur | | | | | 1.5 |
| Sanceler-M | | | | | 0.5 |
| Sanceler-TT | | | | | 1 |
| Zinc white | | | | | 5 |
| Stearic acid | | | | | 1 |
| Aerosil 200 | | | | | |
| Crosslinking rate ($t_c(90)$) [min] | 1000< | 1000< | 105 | 1000< | 1000< |
| Ozone resistance | Lack of cross-linking | Lack of cross-linking | A-2 | Lack of cross-linking | Lack of cross-linking |
| $T_B$ [MPa] | | | 0.4 | 0.1> | 0.1> |
| $E_B$ [%] | | | 120 | 1200 | 900 |

Note: Me in the component (B) methyl group IPA in the component (C) isopropyl alcohol 3-GPTMS in the component (E) 3-glycidoxypropyl trimethoxysilane

TABLE 3

| | Gelation time at room temperature (hrs) |
|---|---|
| Example 1 | 15 |
| 2 | 21 |
| 3 | 29 |
| 4 | 39 |
| 5 | 52 |
| Comparative Ex. 1 | 1000< |
| 2 | 1000< |
| 3 | 105 |
| 4 | 1000< |
| 5 | 1000< |

What is claimed is:

1. A crosslinkable rubber composition, which is crosslinkable at room temperature, has a gelation time at room temperature of 30 days or less, and has the following properties:

a crosslinked rubber sheet obtained by crosslinking the composition at room temperature has a tensile elongation, as measured at a measuring temperature of 20° C. at a tensile rate of 500 mm/min according to JIS K-6251, of 20% or more, and has no crack on the sheet after a treatment at 40° C. in a 50 pphm ozone concentration for 96 hr in accordance with the ozone deterioration test method defined in JIS K-5259.

2. A crosslinkable rubber composition comprising:

(A) an ethylene/α-olefin/non-conjugated polyene random copolymer rubber (A) having structural units derived from at least one norbornene compound having a vinyl group at the end, which compound is non-conjugated polyene, represented by the following formula [I] or [II],

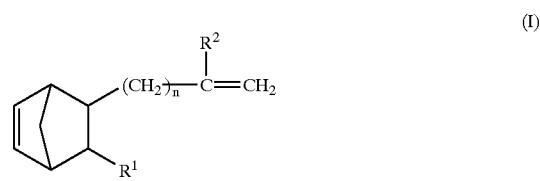

(I)

wherein n is an integer of 0 to 10, $R^1$ is hydrogen or an alkyl group of 1 to 10 carbon atoms, and $R^2$ is hydrogen or an alkyl group of 1 to 5 carbon atoms,

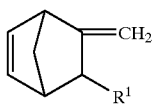

wherein $R^3$ is hydrogen or an alkyl group of 1 to 10 carbon atoms, and (B) an SiH group-containing compound having at least two SiH groups in one molecule; and said composition having a gelation time at room temperature of 30 days or less.

3. A crosslinkable rubber composition comprising:

(A) an ethylene/α-olefin/non-conjugated polyene random copolymer rubber (A) having structural units derived from at least one norbornene compound having a vinyl group at the end, which compound is non-conjugated polyene, represented by the following formula [I] or [II];

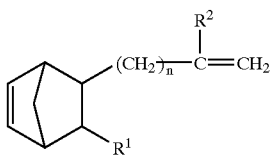

in which n is an integer of 0 to 10, $R^1$ is hydrogen or an alkyl group of 1 to 10 carbon atoms, and $R^2$ is hydrogen or an alkyl group of 1 to 5 carbon atoms,

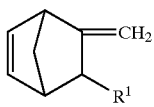

in which $R^3$ is hydrogen or an alkyl group of 1 to 10 carbon atoms, and (B) an SiH group-containing compound having at least two SiH groups in one molecule; and said composition having an adhesion strength to aluminum as determined by JIS A 5758(1986) of from 0.1 to 20 MPa.

4. A crosslinkable rubber composition comprising:

(A) an ethylene/α-olefin/non-conjugated polyene random copolymer rubber having structural units derived from at least one norbornene compound having a vinyl group at the end, which compound is non-conjugated polyene, represented by the following formula [I] or [II];

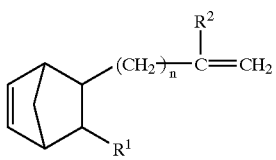

wherein n is an integer of 0 to 10, $R^1$ is hydrogen or an alkyl group of 1 to 10 carbon atoms, and $R^2$ is hydrogen or an alkyl group of 1 to 5 carbon atoms,

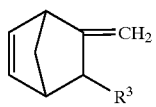

wherein $R^3$ is hydrogen or an alkyl group of 1 to 10 carbon atoms, and (B) an SiH group-containing compound having at least two SiH groups in one molecule, wherein the copolymer rubber (A) has an intrinsic viscosity [η] as measured in decalin at 135° C. of from 0.01 to 0.95 dl/g.

5. A crosslinkable rubber composition comprising:

(A) an ethylene/α-olefin/non-conjugated polyene random copolymer rubber having structural units derived from at least one norbornene compound having a vinyl group at the end, which compound is non-conjugated polyene, represented by the following formula [I] or [II];

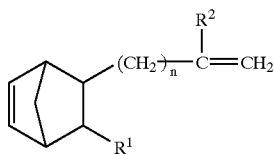

wherein n is an integer of 0 to 10, $R^1$ is hydrogen or an alkyl group of 1 to 10 carbon atoms, and $R^2$ is hydrogen or an alkyl group of 1 to 5 carbon atoms,

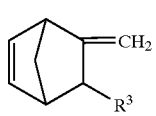

wherein $R^3$ is hydrogen or an alkyl group of 1 to 10 carbon atoms, and (B) an SiH group-containing compound having at least two SiH groups in one molecule, wherein the composition has an adhesion strength to aluminum as determined by JIS A 5758(1986) of from 0.1 to 20 MPa, and the copolymer rubber (A) has an intrinsic viscosity [η] as measured in decalin at 135° C. of 0.01 to 0.95 dl/g.

6. The crosslinkable rubber composition according to claim 1, which has an adhesion strength to aluminum as determined by JIS A 5758(1986) of from 0.1 to 20 MPa.

7. The crosslinkable rubber composition according to claim 1, wherein the ethylene/α-olefin/non-conjugated polyene random copolymer rubber (A) has an intrinsic viscosity [η] as measured in decalin at 135° C. of from 0.01 to 0.95 dl/g.

8. The crosslinkable rubber composition according to claim 2, which has an adhesion strength to aluminum as determined by JIS A5758(1986) of from 0.1 to 20 MPa.

9. The crosslinkable rubber composition according to claim 2, wherein the ethylene/α-olefin/non-conjugated polyene random copolymer rubber (A) has an intrinsic viscosity [η] as measured in decalin at 135° C. of from 0.01 to 0.95 dl/g.

10. The crosslinkable rubber composition according to claim 2, which comprises:
   (A) an ethylene/α-olefin/non-conjugated polyene random copolymer rubber,
   (B) an SiH group-containing compound which has at least two SiH groups in one molecule,
   (C) a catalyst and
   (D) a reaction inhibitor or
   (E) a silane coupling agent.

11. The crosslinkable rubber composition according to claim 3, which comprises:
   (A) an ethylene/α-olefin/non-conjugated polyene random copolymer rubber,
   (B) an SiH group-containing compound which has at least two SiH groups in one molecule,
   (C) a catalyst and
   (D) a reaction inhibitor or
   (E) a silane coupling agent.

12. The crosslinkable rubber composition according to claim 4, which comprises:
   (A) an ethylene/α-olefin/non-conjugated polyene random copolymer rubber,
   (B) an SiH group-containing compound which has at least two SiH groups in one molecule,
   (C) a catalyst and
   (D) a reaction inhibitor or
   (E) a silane coupling agent.

13. The crosslinkable rubber composition according to claim 5, which comprises:
   (A) an ethylene/α-olefin/non-conjugated polyene random copolymer rubber,
   (B) an SiH group-containing compound which has at least two SiH groups in one molecule,
   (C) a catalyst and
   (D) a reaction inhibitor or
   (E) a silane coupling agent.

14. The crosslinked rubber composition according to claim 2 having the following properties:
   a crosslinked rubber sheet obtained by crosslinking the composition at room temperature has a tensile elongation, as measured at a measuring temperature of 20° C. at a tensile rate of 500 mm/min according to JIS K-6251, of 20% or more, and has no crack on the sheet after a treatment at 40° C. in a 50 pphm ozone concentration for 96 hr in accordance with the ozone deterioration test method defined in JIS K-5259.

15. The crosslinked rubber composition according to claim 3 having the following properties:
   a crosslinked rubber sheet obtained by crosslinking the composition at room temperature has a tensile elongation, as measured at a measuring temperature of 20° C. at a tensile rate of 500 mm/min according to JIS K-6251, of 20% or more, and has no crack on the sheet after a treatment at 40° C. in a 50 pphm ozone concentration for 96 hr in accordance with the ozone deterioration test method defined in JIS K-5259.

16. The crosslinked rubber composition according to claim 4 having the following properties:
   a crosslinked rubber sheet obtained by crosslinking the composition at room temperature has a tensile elongation, as measured at a measuring temperature of 20° C. at a tensile rate of 500 mm/min according to JIS K-6251, of 20% or more, and has no crack on the sheet after a treatment at 40° C. in a 50 pphm ozone concentration for 96 hr in accordance with the ozone deterioration test method defined in JIS K-5259.

17. The crosslinked rubber composition according to claim 5 having the following properties:
   a crosslinked rubber sheet obtained by crosslinking the composition at room temperature has a tensile elongation, as measured at a measuring temperature of 20° C. at a tensile rate of 500 mm/min according to JIS K-6251, of 20% or more, and has no crack on the sheet after a treatment at 40° C. in a 50 pphm ozone concentration for 96 hr in accordance with the ozone deterioration test method defined in JIS K-5259.

18. A sealing material comprising the crosslinkable rubber composition of claim 1.

19. A sealing material comprising the crosslinkable rubber composition of claim 2.

20. A sealing material comprising the crosslinkable rubber composition of claim 3.

21. A sealing material comprising the crosslinkable rubber composition of claim 4.

22. A sealing material comprising the crosslinkable rubber composition of claim 5.

23. A potting material comprising the crosslinkable rubber composition of claim 1.

24. A potting material comprising the crosslinkable rubber composition of claim 2.

25. A potting material comprising the crosslinkable rubber composition of claim 3.

26. A potting material comprising the crosslinkable rubber composition of claim 4.

27. A potting material comprising the crosslinkable rubber composition of claim 5.

28. A coating material comprising the crosslinkable rubber composition of claim 1.

29. A coating material comprising the crosslinkable rubber composition of claim 2.

30. A coating material comprising the crosslinkable rubber composition of claim 3.

31. A coating material comprising the crosslinkable rubber composition of claim 4.

32. A coating material comprising the crosslinkable rubber composition of claim 5.

33. An adhesive comprising the crosslinkable rubber composition of claim 1.

34. An adhesive comprising the crosslinkable rubber composition of claim 2.

35. An adhesive comprising the crosslinkable rubber composition of claim 3.

36. An adhesive comprising the crosslinkable rubber composition of claim 4.

37. An adhesive comprising the crosslinkable rubber composition of claim 5.

38. Articles of manufacture comprising electric and electronic parts, transportation machines, civil engineering and construction materials, medical appliances and goods for leisure activities made from the cross-linkable composition according to claim 1.

39. Articles of manufacture comprising electric and electronic parts, transportation machines, civil engineering and construction materials, medical appliances and goods for leisure activities made from the cross-linkable composition according to claim 2.

40. Articles of manufacture comprising electric and electronic parts, transportation machines, civil engineering and construction materials, medical appliances and goods for leisure activities made from the cross-linkable composition according to claim 3.

41. Articles of manufacture comprising electric and electronic parts, transportation machines, civil engineering and construction materials, medical appliances and goods for leisure activities made from the cross-linkable composition according to claim 4.

42. Articles of manufacture comprising electric and electronic parts, transportation machines, civil engineering and construction materials, medical appliances and goods for leisure activities made from the cross-linkable composition according to claim 5.

* * * * *